(12) United States Patent
Pelinsky

(10) Patent No.: US 8,595,866 B2
(45) Date of Patent: Dec. 3, 2013

(54) FISHING FINGER PROTECTION APPARATUS

(76) Inventor: William Pelinsky, Dix Hills, NY (US)

( * ) Notice: Subject to any disclaimer, the term of this patent is extended or adjusted under 35 U.S.C. 154(b) by 372 days.

(21) Appl. No.: 12/836,534

(22) Filed: Jul. 14, 2010

(65) Prior Publication Data

US 2012/0011634 A1    Jan. 19, 2012

(51) Int. Cl.
*A63B 71/14* (2006.01)
*A41D 13/08* (2006.01)

(52) U.S. Cl.
USPC .............................................. 2/161.5; 2/163

(58) Field of Classification Search
USPC ......... 2/161.5, 159, 160, 161.6, 161.4, 161.2, 2/162, 163
See application file for complete search history.

(56) References Cited

U.S. PATENT DOCUMENTS

| | | | |
|---|---|---|---|
| 362,593 A | 5/1887 | Wells | |
| 2,155,753 A | 4/1939 | Cook | |
| 2,827,635 A | 3/1958 | Rasmus | |
| 2,980,915 A | 4/1961 | Peterson | |
| 3,229,403 A | 1/1966 | Thomas | |
| 4,051,553 A * | 10/1977 | Howard | 2/20 |
| 4,689,828 A * | 9/1987 | Brewer | 2/21 |
| 4,881,276 A | 11/1989 | Swan | |
| 5,177,893 A | 1/1993 | Huntt | |
| 5,497,510 A * | 3/1996 | Knowles et al. | 2/21 |
| 5,933,863 A * | 8/1999 | Monsue | 2/21 |
| 6,009,557 A | 1/2000 | Witta | |
| 6,341,376 B1 * | 1/2002 | Smerdon, Jr. | 2/16 |
| 6,810,530 B2 | 11/2004 | Bryant, Sr. | |
| D549,397 S | 8/2007 | VanErmen | |
| 2008/0235843 A1 | 10/2008 | Stinchcomb | |

FOREIGN PATENT DOCUMENTS

JP      02002017221 A    1/2002

OTHER PUBLICATIONS

Aquaskinz Catalogue, dated 2011; Aquaskinz Finger Shield, p. 6; Lindenhurst, New York 11757; www.aquaskinz.com + info @aquaskinz.com.

* cited by examiner

*Primary Examiner* — Gloria Hale
(74) *Attorney, Agent, or Firm* — Harold G. Furlow, Esq.

(57) ABSTRACT

A fishing finger protection apparatus is disclosed that provides protection for an index finger of an angler during casting with a spin reel fishing rod. The finger protection apparatus includes a finger guard, a strap and a wrist band. The finger guard receives a distal end portion of the index finger of the angler in an approximately form fitting relation. The finger guard includes a first portion, opposing sidewalls and a back portion. The first portion protects the palmar side of the index finger and the sidewalls protect the sides of the index finger. The back portion can stretch to accommodate the size of the finger of the angler. The strap connects the finger guard and the wrist band.

15 Claims, 4 Drawing Sheets

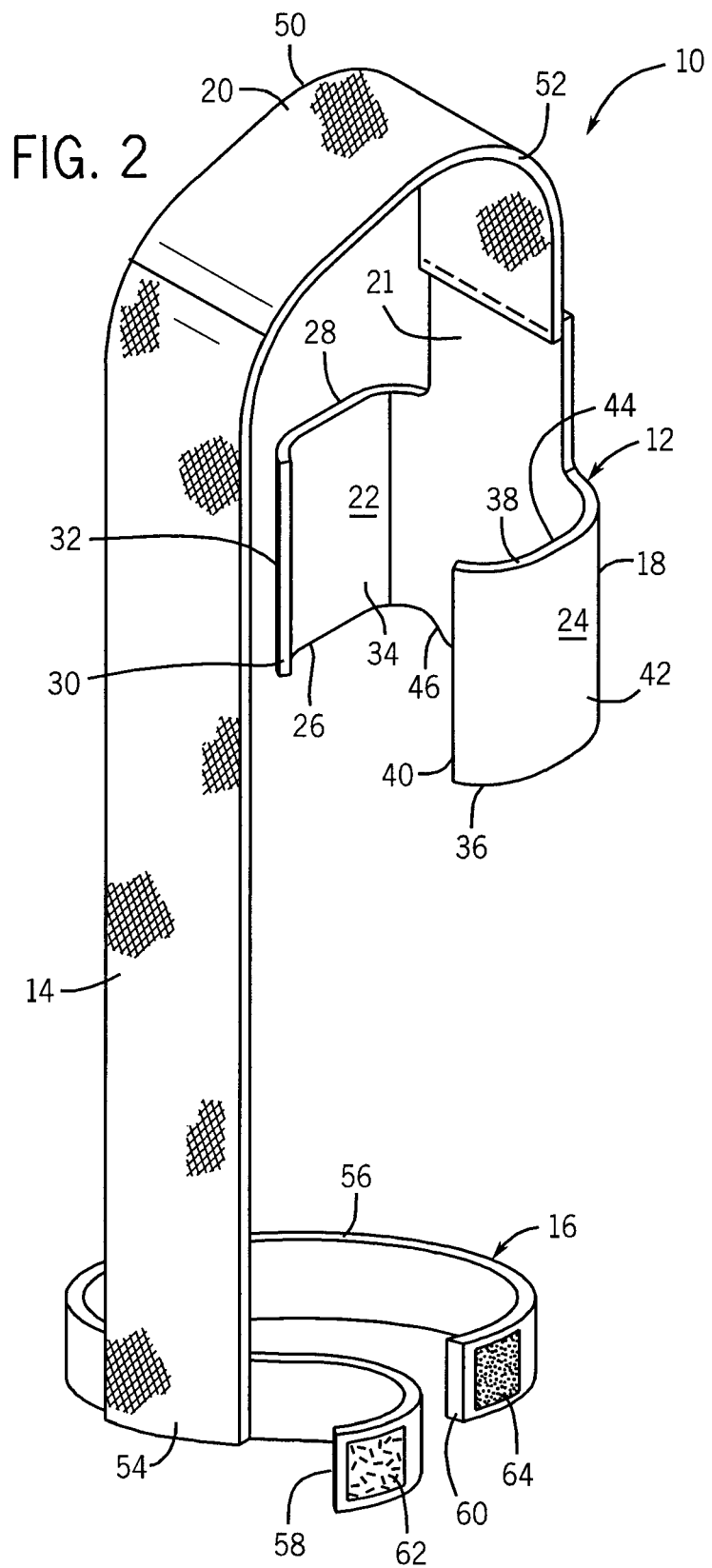

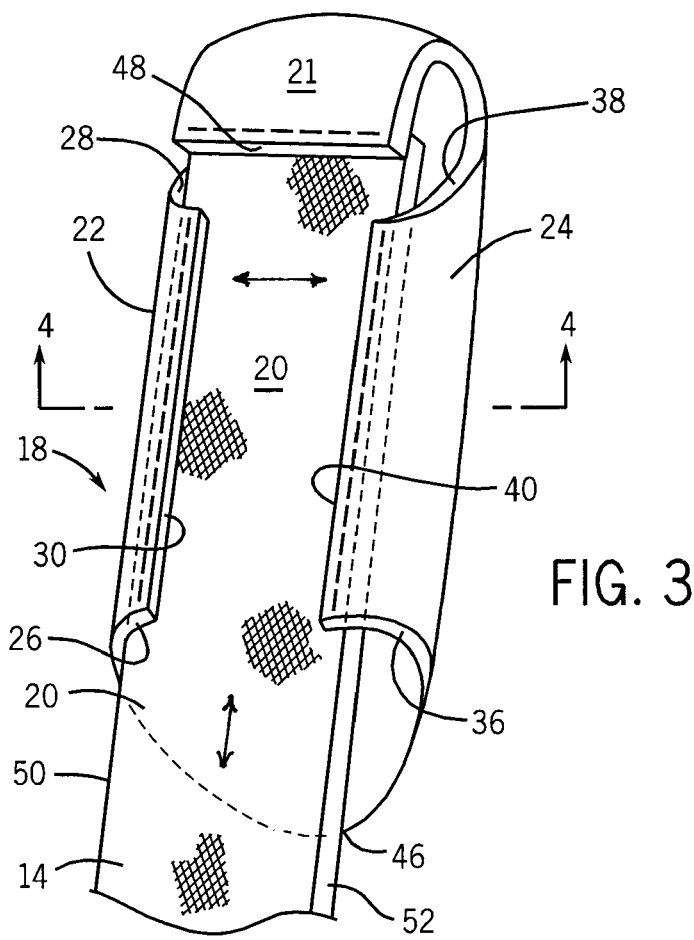
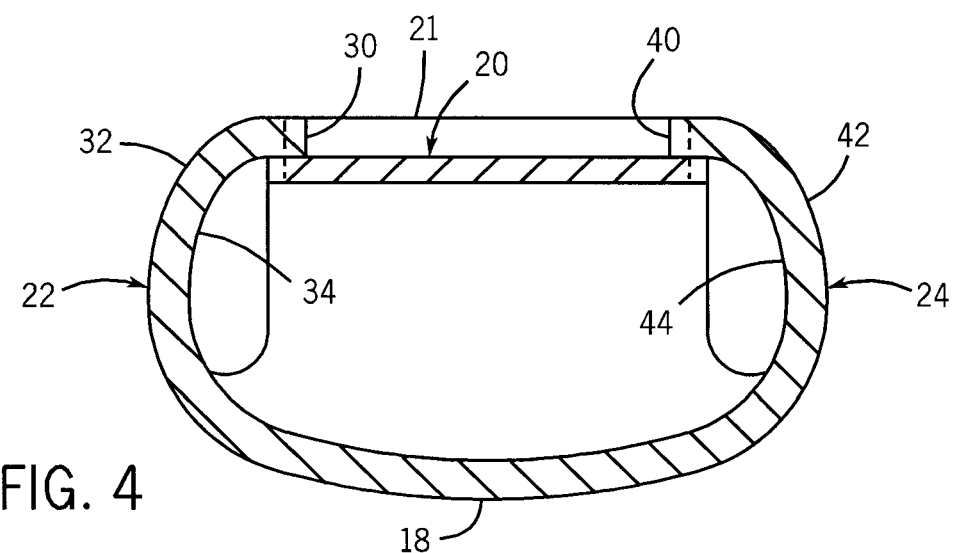

FISHING FINGER PROTECTION APPARATUS

BACKGROUND OF THE INVENTION

1. Field of the Invention

This disclosure relates to a finger protective apparatus for anglers and in particular to fishing finger protection apparatuses for the index fingers of anglers while using spin reel fishing rods.

2. Description of the Related Art

Finger protecting devices are common for many different fishing applications to include protecting the wearer from the teeth and spines of the fish. Finger protecting devices also include those specialized for the thumb for use with bait casting fishing rods where the reel is perpendicular to the axis of the fishing rod and the thumb is used to fix the position of the reel and fishing line during the initial phase of casting. The protective needs of anglers, however, also include the need to protect the index fingers of anglers that use spin reel fishing rods. In particular, spin reel anglers need to protect their index fingers from repeatedly pressing and fixing the fishing line against the fishing rod during casting. Using an unprotected index finger to hold the fishing line in position can rapidly subject the index finger to irritation, chaffing, blistering and undesirable cutting of the skin due to the relatively thin fishing line relative to the rigid surface of the fishing rod. A device is needed that is specifically tailored to protect the index finger of spin reel anglers when casting while retaining the fine dexterity of the index finger required for other common fishing applications.

SUMMARY OF THE INVENTION

A fishing finger protection apparatus is described for the protection of an index finger of an angler during casting with a spin reel fishing rod. The finger protection apparatus comprises a finger guard, a strap and a wrist band. The finger guard is adapted to receive a distal end portion of the index finger the angler and includes a first portion, sidewalls and a back portion.

The first portion defines a distal end portion of the finger guard with the sidewalls and the back portion. The first portion of the finger guard includes a front side of the finger guard that protects a palmar or front side of the index finger. The first portion extends longitudinally from a first proximal end portion on the front side of the finger guard for a predetermined distance to a second proximal end portion on the back side of the finger guard. The first proximal end portion of the first portion is adapted for positioning in proximity to a middle joint on the palmar side of the angler's index finger. In one preferred embodiment the second proximal end portion extends the predetermined distance to or in proximity to the finger nail on the back of the index finger of the angler. The sidewalls include a first sidewall and a second sidewall. The sidewalls extend laterally from the opposing longitudinally aligned edges or sides of the first portion. The sidewalls define elongate longitudinal edge portions. The sidewalls protect the sides of the index finger of the angler.

The back portion is a strip of material that includes a distal end portion, a proximal end portion that opposes the distal end portion, a first longitudinal end portion and a second longitudinal end portion that opposes the first longitudinal end portion. The proximal and distal end portions are connected by the longitudinal end portions to define the back portion. The back portion includes a first inwardly directed side and an opposed outwardly directed second side. The distal end portion of the back portion connects to the second proximal end portion of the first portion. The first longitudinal edge portion of the first sidewall connects to the first longitudinal end portion of the back portion and the second longitudinal edge portion of the second sidewall connects to the second longitudinal end portion of the back portion. The second proximal end portion of the first portion, the first sidewall and the second sidewall connect to the back portion in an overlaying and/or overlapping relation relative to the back portion. The back portion is preferably an elastic material that resiliently expands laterally. The first portion, sidewalls and back portion define an approximately cylindrical tubular shape that approximately conforms to and mates with the index finger of the angler. The approximately conforming fit is due to the expandable diameter of the back portion of the finger guard. The cylindrical tubular shape of the first portion, sidewalls and back portion provide an approximately form fitting dexterity that aids in the selective application and release of the fishing line during casting without catching or binding on other parts of the fishing rod. The wrist band is an elongate strip the preferably has an annular shape. The wrist ban can include terminal end portions that adjustably connect together. The strap connects the band and the back portion of the finger guard.

The first portion of the finger guard and the sidewalls are preferably constructed of leather. The annular band of fishing finger protection apparatus includes a first terminal end portion and a second terminal end portion that can adjustably connect together. The elasticity of the back portion provides the ability for the angler to remove the finger guard from the index finger of the angler while the band is connected to the angler's wrist.

A method of casting a spin reel fishing rod is also described that comprises the steps of providing a spin reel fishing rod and a fishing finger protection apparatus that includes the finger guard, strap and wrist band. The finger guard conformingly protects the distal end portion of an index finger of an angler. The strap connects the finger guard and the wrist band. The finger guard includes a first portion that protects the palmar side distal end portion of the index finger of the angler distal from in proximity to a middle joint of the angler and onto the back of the index finger for a predetermined distance. The sidewalls of the finger guard protect the sides of the index finger distal to the middle joint. The first portion and sidewalls connect to an elastic back portion.

Using the fishing finger protection apparatus includes positioning the finger guard of the fishing finger protection apparatus onto the index finger of the angler. The finger guard extends from in proximity to the middle joint of the index finger on the palmar side to approximately between one-quarter (¼) and one-half (½) of an inch on the back side of the index finger of the angler.

The positioning of the fishing finger protection apparatus also includes positioning the wrist band around a wrist of the angler. The finger guard is elastically connected to the strap and wrist band.

Casting using the fishing finger protection apparatus includes using the index finger of the angler wearing the index finger guard to press a portion of a fishing line in proximity to the spin reel into contact with a rod of the fishing rod. The pressing of the portion of fishing line by the index finger of the angler fixes the position of the fishing line against the rod.

Casting using the fishing finger protection apparatus can further include releasing a bail or brake of the spin reel and entering a first phase of casting with the fishing line fixed by the index finger of the angler wearing the fishing finger protection apparatus. A second phase of casting includes the index finger of the angler protected by the finger guard releasing the fishing line from the fixed initial position for casting.

The positioning of the wrist band further on the wrist of the angler can further include stretching the elastic back portion to accommodate the distance between the distal end of the finger of the angler and the wrist of the angler. The method of casting can further include the step of removing the finger guard from the index finger of the wearer by longitudinally stretching the back portion of the finger guard while the wrist band is connected to the wrist of the angler. The step of positioning can further include the back portion of the finger guard expanding in diameter to accommodate the size of the angler's index finger.

BRIEF DESCRIPTION OF THE DRAWINGS

Preferred embodiments of the invention are described below with reference to the drawings, wherein like numerals are used to refer to the same or similar elements.

FIG. 2 is a back, right side and distal end portion perspective view of the fishing finger protection apparatus of FIG. 1 partially disassembled;

FIG. 3 is a close up perspective view of the back, right side and distal end portion of the finger guard of the fishing finger protection apparatus of FIG. 1;

FIG. 4 is a cross-sectional view taken along lines 4-4 of FIG. 3 of the finger fishing protection apparatus showing the overlapping relationship of the finger guard.

DETAILED DESCRIPTION OF THE INVENTION

Figure 1:
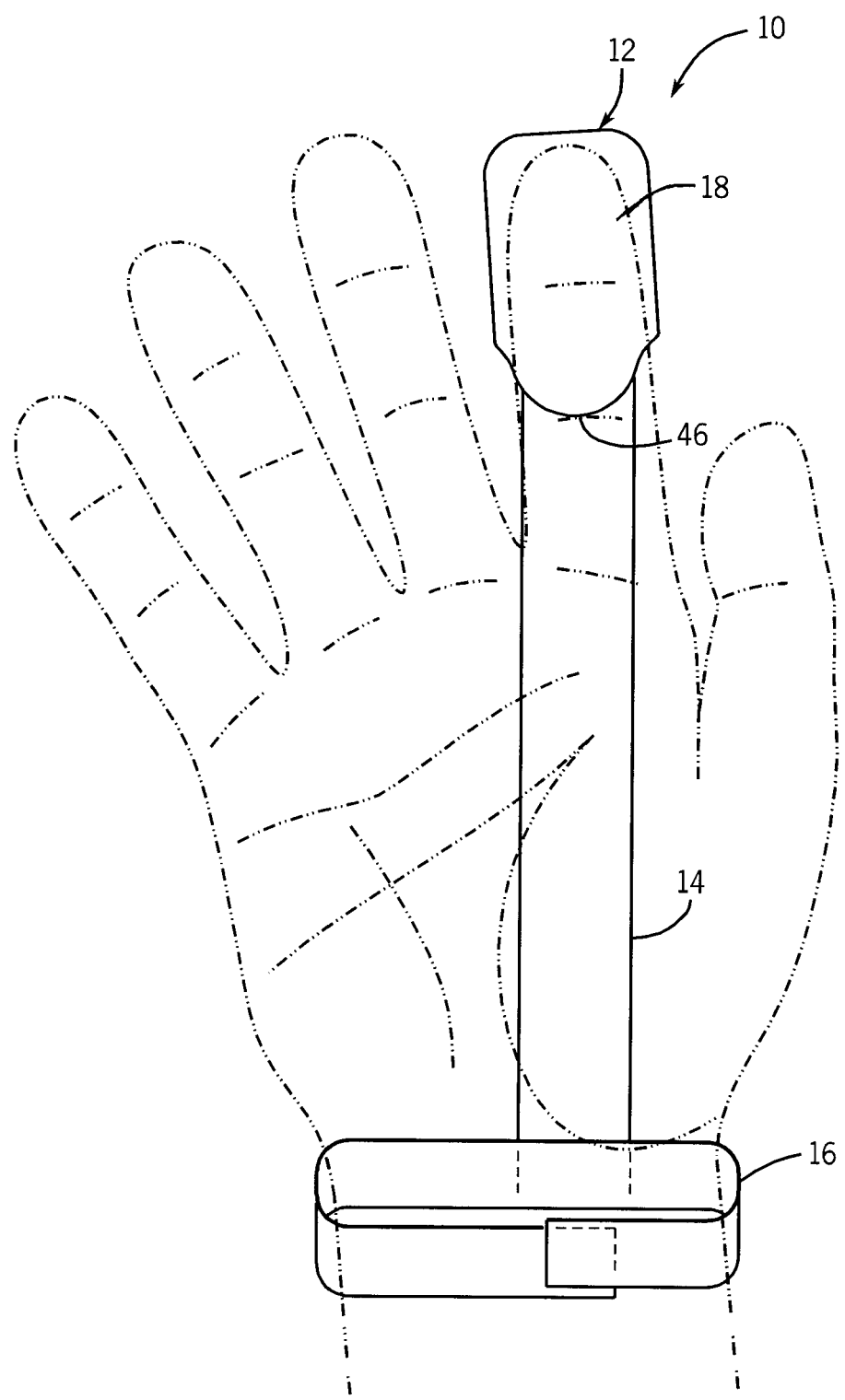
FIG. 1 is a frontal view of a fishing finger protection apparatus constructed in accordance with the present disclosure.

Referring to FIG. 1, a fishing finger protection apparatus 10 is shown that protects a distal end portion of an index finger of an angler. Fishing finger protection apparatus or finger protector 10 includes a finger guard 12, a strap 14 and a band 16. Guard 12 and band 16 are connected by strap 14. Finger guard 12 includes a first portion 18 that is constructed to protect the front or palmar side of the distal end portion of the index finger of the angler or wearer. Finger guard 12 is an elongate strip that defines a receptacle for the distal end portion of the index finger of the wearer.

As shown in FIGS. 1 and 2, guard 12 includes first portion 18, a back portion 20, a first sidewall 22 and a second sidewall 24 opposed to first sidewall 22. First portion 18, first sidewall 22 and second sidewall 24 are connected together by back portion 20 to form finger guard 12.

Referring now to FIGS. 2 and 3, first portion 18 has elongate opposed longitudinal sides or edges that connect to first sidewall 22 and second sidewall 24. First portion 18 and sidewalls 22 and 24 can be integrally connected, but are preferably a single continuous piece of material. First sidewall 22 has a first approximately laterally extending edge 26 and a second approximately laterally extending edge 28 opposed to first edge 26 that extend from first portion 18. Edges 26 and 28 are connected by an elongate edge 30. First sidewall 22 has an outwardly projecting side or outer surface 32 and an inwardly projecting inner surface 34. Similarly, second sidewall 24 has a first approximately laterally extending edge 36 and a second approximately laterally extending edge 38 opposed to first edge 36 that extend from first portion 18. Edges 36 and 38 are connected by an elongate edge 40.

Second sidewall 24 has an outwardly projecting side or outer surface 42 and an inwardly projecting side or inner surface 44.

As shown in FIGS. 2-4, first portion 18 extends longitudinally between a first proximal end portion 46 on the palmar side and a second proximal end portion 48 that at least partially extends to form part of the back side of finger guard 12. First portion 12 preferably bends in an arcuate shape approximately one hundred eighty (180) degrees to define a receptacle for the index finger of the angler between first proximal end portion 46 and second proximal end portion 48. A distal end portion 21 of finger guard 12 includes second proximal end portion 48 and distal portions of first portion 12. In this preferred embodiment small apertures are formed between distal end portion 21 and sidewalls 22 and 24, respectively. The small apertures defined between second proximal end portion 48 and sidewalls 22 and 24 in distal end portion 21 provide for air circulation which aides in the cooling of the finger of the angler and the drying of finger guard 12.

Back portion 20 includes a first longitudinal edge 50 and an opposed second longitudinal edge 52. A distal end portion of back portion 20 connects to second proximal end portion 48 and a proximal end portion of back portion 20 connects to strap 14. Second proximal end portion 48 of first portion 12 preferably connects on the outside of and overlaps at least part of the distal end portion of back portion 20. Sidewalls 22 and 24 connect to back portion 20 in proximity to edges 50 and 52. Edge 30 of sidewall 22 and edge 40 of sidewall 24 are preferably positioned to extend onto and overlap the outwardly directed side of back portion 20 such that inner sides 34 and 44 are in contact with back portion 20. The overlapping construction of second proximal end portion 48 of distal end portion 21 as well as the overlapping of edges 30 and 40 of sidewalls 22 and 24, respectively, is preferable because this reduces the likelihood of any edges or rough surfaces creating undesirable chaffing and rubbing against the index finger of the wearer. Distal end portion 21, sidewall 22 and sidewall 24 are preferably connected to back portion 20 by sewing, but other means can include adhesives, mechanical connections such as snaps or hook and loop devices and heat bonding, for example, depending upon the materials used. Back portion 20 can be continuous with strap 14 or integrally connected.

Strap 14 is an elongate flexible piece of material that extends between wrist band 16 and back portion 20. Strap 14 is preferably an elastic material that resiliently stretches between wrist band 16 and finger guard 12. It is understood, however, that strap 14 can be fabricated from a broad range of natural and man made materials to include for example leather and/or polymers with little or no resilient and/or elastic properties.

Wrist band 16 connects to a proximal end portion 54 of strap 14. Wrist band 16 includes a band 56 that is an elongate strip. Band 56 has opposed longitudinal edges and opposed terminal end portions 58 and 60 that preferably include connectors that selectively attach terminal end portions 58 and 60 together. The connectors can include, for example, interfacing components such as commonly employed to include a buckle, snap, friction or an alternative common connection such as a hook and loop device 62, 64 preferably located in proximity to distal end portions, 58 and 60.

First portion 18, sidewall 22 and sidewall 24 are preferably fabricated from leather or a similar soft flexible natural or man made material that combines qualities of long lasting wear and resistance to damage from water and saltwater. In one preferred embodiment, the thickness of leather and as an example, first portion 12, sidewall 22 and sidewall 24 have a thickness between approximately $1/16^{th}$ and approximately $1/8^{th}$ of an inch.

Back portion 20 is preferably fabricated of a resilient material that accommodates stretching in both a longitudinal axis along the axis of strap 14 as well as between sidewalls 22 and 24 or on an axis approximately perpendicular to the longitudinal axis. This dual resilience accommodates the flexible expansion in diameter of finger guard 12 with a larger finger diameter of a user. Back portion 20 has sufficient length to provide a resilient structure that enhances the attachment of finger guard 12 on the index finger of the wearer by placing a bias between finger guard 12 positioned over the index finger tip of the wearer and wrist band 16. Alternative materials for back portion 20 include other natural and/or man made materials as well as combinations of materials. As is well known leather can include, for example, folds or slits that can provide a controlled degree of elasticity and/or resilience.

Figure 5:
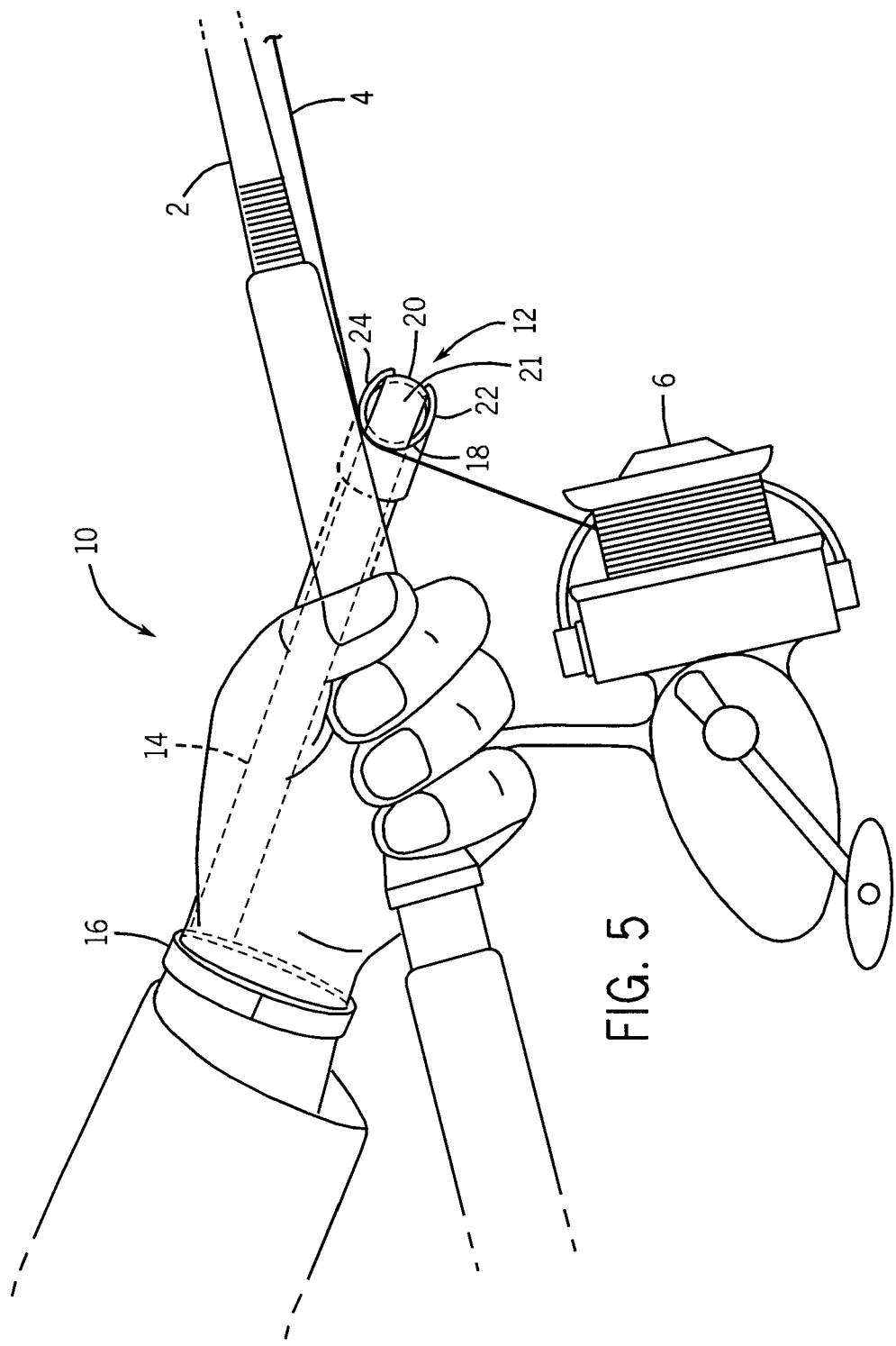
FIG. 5 is a side perspective view of an angler holding a spin fishing rod using the fishing finger protection apparatus to fix the fishing line against the fishing rod.

In operation, as shown in FIGS. 1, 2 and 5, fishing finger protection apparatus 10 is constructed for use with spin reel fishing rod with a reel that has an axis of rotation that is approximately aligned with the rod. The wearer positions finger guard 12 over the distal end portion of their index finger such that first edge 46 of first portion 18 extends proximally to a position in proximity to the middle joint on the palmar side of the hand. The middle joint as defined herein is the joint proximal to the upper or top joint closest to the fingernail. First edge 46 preferably includes an arcuate extension that preferably at least covers the wearer's palmar side of the middle joint.

Fishing finger protection apparatus 10 is constructed to terminate in proximity to the middle joint on the palmar side of the index finger in order to facilitate the unrestricted bending of the wearer's index finger at the middle joint and the next proximal joint, the base joint. Similarly, back portion 20 is constructed to flexibly accommodate bending of the index finger by accommodating the longitudinal stretching of at least back portion 20 when the index finger of the wearer is bent. In addition, the flexible material of back portion 20 accommodates the size of the index finger of the wearer to include both the diameter of the finger and the length between the finger tip and wrist of the wearer as connected by finger guard 12, strap 14 and wrist band 16.

Wrist band 16 is connected around the wrist of the wearer and strap 14 and/or back portion 20 preferably places a proximal bias on finger guard 12 that assists in the retention of finger guard 12 on the index finger of the wearer. In addition, the elastic material of back portion 20 preferably provides a conforming fit around the index finger of the wearer that aids in the dexterity required for bending the finger and retaining the fishing line fixed against the fishing rod. A form fitting relation is also desired with the index finger of the wearer because this aids the wearer in the retention of finger guard 12 on the index finger of the wearer.

Fishing finger protection apparatus 10 is constructed for operational employment during fishing. The construction of finger guard 12 and in particular the limiting of the length of finger guard 12 on the palmar side of the distal end portion of the index finger of the angler aids in the retaining the movement and dexterity required for fishing. This includes routine tasks prior to casting as well as during fishing such as reeling in the fishing line. Fishing finger protection apparatus 10 is constructed to minimally impact additional manual functions during fishing. Finger guard 12 is employed to compress the fishing line from a spin reel fishing rod against the rod to fix the line in position during the initial phase of casting. This can include compressing the fishing line using first portion 18 and/or one of sides 22 or 24 which are also constructed to protect the index finger of the angler. This first phase can typically include a wind-up that has a backward or sideward type motion from which the rod is then rotated forward. As the rod is rotated forward the index finger of the angler protected by finger guard 12 releases the line that had been previously held in place against the fishing rod and the line runs out with the fishing lure in a preferably arcing cast. In addition, in this latter phase of the cast as the line is released by the index finger of the angler, finger guard 12 protects the index finger of the angler from the friction of the running of the fishing line as it runs from the reel. Finger guard 12 advantageously reduces the repeated chaffing and friction that is otherwise encountered directly by the index finger of the spin angler.

The elastic band 20 and/or strap 14 that aids in retaining finger guard 12 on the index finger of the angler can also be readily stretched for the removal of finger guard 12 from the index finger of the angler while wrist band 16 stays connected to the wrist of the angler. The retention of wrist band 16 advantageously retains finger protection apparatus 10 connected to the wrist of the angler so that apparatus 10 is not inadvertently dropped in the water, in a boat or on the ground. Once the angler has completed the required task, fishing finger guard 12 can be readily replaced on the index finger of the angler.

In the preceding specification, the present disclosure has been described with reference to specific exemplary embodiments thereof. It will be evident, however, that various modifications, combinations and changes may be made thereto without departing from the broader spirit and scope of the invention as set forth in the claims that follow. For example, while the fishing finger protection apparatus 10 is described herein for use with spin reel fishing rods, it is understood that the fishing finger protection apparatus 10 can be selectively used in other applications. In addition, though the present invention is described in terms of a series of embodiments, each embodiment of the present invention can combine one or more novel features of the other embodiments. The specification and drawings are accordingly to be regarded in an illustrative manner rather than a restrictive sense.

What is claimed is:

1. A finger protection apparatus adapted for the protection of an index finger, the finger protection apparatus comprises:
    a finger guard adapted to receive a distal end portion of an index finger, the finger guard includes
        a first portion that extends longitudinally from a first proximal end portion on a front side of the finger guard to a second proximal end portion on a back side of the finger guard, the first portion defines a distal end portion of the finger guard and the first proximal end portion of the first portion adapted to be positioned in proximity to a middle joint of the index finger with the first proximal end portion adapted to receive the palmar side of the index finger and the second proximal end portion adapted to receive the back side of the index finger,
        a first sidewall and a second sidewall that extend laterally from opposing longitudinally aligned edges of the first portion, the sidewalls define elongate longitudinal edge portions,
        a back portion that is a strip of material that includes a distal end portion and an opposing proximal end portion, a first longitudinal edge portion and an opposing second longitudinal edge portion, the proximal and distal end portions connected by the longitudinal edge portions to define the back portion, the back portion includes a first inwardly directed side and an opposed outwardly directed second side, the distal end portion of the back portion connects to the second proximal end portion of the first portion, the first longitudinal edge portion of the first sidewall connects to the first longitudinal edge portion of the back portion, the second longitudinal edge portion of the second sidewall connects to the second longitudinal edge portion of the back portion, the second proximal end portion of the first portion, the first sidewall and the second sidewall connected to the back portion, the back portion being an elastic material that resiliently expands laterally, the first portion and the back portion defining an approximately cylindrical tubular shape with an expandable diameter;

an annular wrist band, the wrist band adapted to adjust to different size wrists; and a strap that connects the wrist band and the back portion of the finger guard.

2. The finger protection apparatus of claim 1, wherein the first portion is connected to the back portion by sewing.

3. The finger protection apparatus of claim 1, wherein the back portion is a portion of the strap.

4. The finger protection apparatus of claim 1, wherein the wrist band includes a first terminal end portion and a second terminal end portion, the first terminal end portion and the second terminal end portion are adjustably connectable together.

5. The finger protection apparatus of claim 1, wherein the elasticity of the back portion is adapted to accommodate the removal of the finger guard from the index finger while the wrist band is connected to the wrist.

6. The finger protection apparatus of claim 1, wherein the connection between the sidewalls and the first portion to the back portion includes the longitudinal edge portions of the sidewalls and the proximal end portion of the first portion positioned over the back portion in an overlaying relationship.

7. The finger protection apparatus of claim 1, wherein the expansion of the back portion in a lateral direction is expandable and the expansion is adapted to accommodate an increased diameter of the index finger.

8. The finger protection apparatus of claim 1, wherein the back portion expands in a longitudinal direction and the expansion is adapted to accommodate an increased distance between the tip of the index finger and the wrist.

9. A method of using a fishing finger protection apparatus, the method comprising the steps of:

providing a fishing rod and a finger protection apparatus that includes a finger guard, a strap and a wrist band, the finger guard adapted to conformingly protect a distal end portion of an index finger of an angler, the strap connecting the first protection apparatus and the wrist band, the finger protection apparatus including a first portion adapted for protecting a palmar side of an index finger approximately distal to a middle joint of the angler and further including sidewalls that protect the sides of the index finger distal to the middle joint, the first portion and sidewalls connected by an elastic back portion;

positioning a finger guard of the finger protection apparatus onto an index finger of the angler, the finger guard adapted to extend from in proximity to the middle joint of the index finger on the palmar side to at least a portion of the back side of the index finger;

positioning a wrist band of the finger protection apparatus around a wrist of the angler, the wrist band connected to the finger guard by a strap;

using the finger guard of the finger protection apparatus to press a portion of a fishing line of the fishing rod into contact with a rod of the fishing rod, the pressing of the portion of fishing line fixing the position of the fishing line against the rod, the strap resiliently accommodating stretching between the wrist band and the finger guard;

entering a first phase of casting by fixing the fishing line against the rod using the finger guard; and entering a second phase of casting by using the finger guard to release the fishing line fixed against the fishing rod for casting.

10. The method of using a finger protection apparatus during the casting of a fishing rod of claim 9, wherein the positioning of the wrist band further includes the stretching of the elastic back portion, the elastic back portion adapted to stretch and accommodate the distance between the distal end of the finger of the angler and the position of the wrist band, the positioning of the strap optionally including longitudinally extending the length of the strap.

11. The method of using a finger protection apparatus during the casting of a fishing rod of claim 9 that further includes the step of removing the finger guard by longitudinally stretching the back portion of the finger guard while wearing the wrist strap.

12. The method of using a finger protection apparatus during the casting of a fishing rod of claim 9, wherein the step of positioning further includes the back portion of the finger guard expanding, the back portion expandable in diameter and adapted to receive index fingers of varying diameters.

13. The method of using a finger protection apparatus during the casting of a fishing rod of claim 9, wherein the providing of a fishing rod includes providing a spin reel fishing rod.

14. The method of using a finger protection apparatus during the casting of a fishing rod of claim 9, wherein the step of using the finger guard of the finger protection apparatus to press a portion of a fishing line of the fishing rod into contact with the rod includes pressing the fishing line into contact with the rod in proximity to a spin reel of the fishing rod.

15. The method of using a finger protection apparatus during the casting of a fishing rod of claim 9, wherein the step of entering a first phase of casting further includes releasing a bail of a spin reel of the fishing rod and fixing the fishing line against the rod using the index finger of the angler protected by the finger guard.

* * * * *